US012574070B2

(12) United States Patent
Verso et al.

(10) Patent No.: US 12,574,070 B2
(45) Date of Patent: Mar. 10, 2026

(54) RECEIVER CIRCUIT FOR DETECTING AND WAKING UP TO A WAKEUP IMPULSE SEQUENCE

(71) Applicant: Qorvo US, Inc., Greensboro, NC (US)

(72) Inventors: Billy Verso, Maynooth (IE); Michael McLaughlin, Dublin (IE)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 18/587,586

(22) Filed: Feb. 26, 2024

(65) Prior Publication Data

US 2024/0333335 A1     Oct. 3, 2024

Related U.S. Application Data

(60) Provisional application No. 63/522,733, filed on Jun. 23, 2023, provisional application No. 63/492,592, filed on Mar. 28, 2023.

(51) Int. Cl.
*H04B 1/7163*     (2011.01)
*H04B 1/7176*     (2011.01)

(52) U.S. Cl.
CPC ....... *H04B 1/71637* (2013.01); *H04B 1/7176* (2013.01)

(58) Field of Classification Search
CPC .............. H04B 1/71637; H04B 1/7176; H04B 1/71635; H04B 1/717; Y02D 30/70; H04W 52/0235
See application file for complete search history.

(56) References Cited

U.S. PATENT DOCUMENTS

| | | | |
|---|---|---|---|
| 2,872,673 A | 2/1959 | Pleasure |
| 4,682,358 A | 7/1987 | Werner |

(Continued)

FOREIGN PATENT DOCUMENTS

| | | | |
|---|---|---|---|
| EP | 1016241 A2 | 7/2000 |
| EP | 3993512 A1 | 5/2022 |

(Continued)

OTHER PUBLICATIONS

Hussain, Z., "Performance Evaluation of Wake-Up Radio Based Wireless Body Area Network," Master's Thesis, Degree Programme in Wireless Communications Engineering, University of Oulu, Oct. 2016, 58 pages.

(Continued)

*Primary Examiner* — Sam K Ahn
*Assistant Examiner* — Amneet Singh
(74) *Attorney, Agent, or Firm* — Withrow & Terranova, P.L.L.C.

(57) ABSTRACT

A receiver circuit for detecting and waking up a wakeup impulse sequence is provided. Herein, a transmitter circuit is configured to transmit a wakeup impulse sequence to wake up a receiver circuit. The receiver circuit includes a main receiver circuit and a wakeup receiver circuit. The main receiver circuit, which consumes far more energy than the wakeup receiver circuit, will remain in sleep mode as much as possible to conserve power. While the main receiver circuit is asleep, the wakeup receiver circuit is configured to detect the wakeup impulse sequence and wake up the main receiver circuit if the wakeup impulse sequence is intended for the receiver circuit. By keeping the main receiver circuit asleep as much as possible, it is possible to reduce power consumption, thus making the receiver circuit an ideal receiver option for an Internet-of-Things (IoT) device(s).

20 Claims, 9 Drawing Sheets

(56) References Cited

U.S. PATENT DOCUMENTS

| 4,801,836 | A | 1/1989 | Mariani |
|---|---|---|---|
| 7,155,263 | B1 | 12/2006 | Bergamo |
| 8,164,416 | B2 | 4/2012 | Lee et al. |
| 8,543,002 | B1 | 9/2013 | Mui |
| 9,386,524 | B2 | 7/2016 | Feuersaenger et al. |
| 9,537,543 | B2 | 1/2017 | Choi |
| 10,310,069 | B2 | 6/2019 | Younis |
| 10,663,559 | B2 | 5/2020 | Huemer et al. |
| 11,451,209 | B2 | 9/2022 | Gong et al. |
| 2005/0122944 | A1 | 6/2005 | Kwon et al. |
| 2005/0152305 | A1 | 7/2005 | Ji et al. |
| 2010/0159866 | A1 | 6/2010 | Fudge et al. |
| 2011/0140851 | A1 | 6/2011 | Lee et al. |
| 2011/0200026 | A1 | 8/2011 | Ji et al. |
| 2014/0211678 | A1 | 7/2014 | Jafarian et al. |
| 2015/0081040 | A1 | 3/2015 | Apte et al. |
| 2015/0350027 | A1 | 12/2015 | Raissinia et al. |
| 2016/0173662 | A1* | 6/2016 | Seok .................... H04L 1/1896 370/252 |
| 2016/0337973 | A1 | 11/2016 | Park et al. |
| 2016/0344574 | A1 | 11/2016 | Choi et al. |
| 2017/0187415 | A1 | 6/2017 | Choi |
| 2017/0288639 | A1 | 10/2017 | Elsherbini et al. |
| 2017/0331456 | A1 | 11/2017 | Ono |
| 2018/0009112 | A1 | 1/2018 | Williams |
| 2018/0084501 | A1 | 3/2018 | Mu et al. |
| 2018/0110000 | A1 | 4/2018 | Shellhammer et al. |
| 2018/0132177 | A1 | 5/2018 | Gandhi et al. |
| 2018/0254925 | A1 | 9/2018 | Dutz et al. |
| 2019/0090191 | A1* | 3/2019 | Liu ......................... H04W 4/08 |
| 2019/0116555 | A1 | 4/2019 | Kristem et al. |
| 2019/0162843 | A1 | 5/2019 | Jiang et al. |
| 2019/0306811 | A1 | 10/2019 | Balakrishnan et al. |
| 2020/0249351 | A1 | 8/2020 | Chen et al. |
| 2020/0252131 | A1* | 8/2020 | Jang ......................... H04L 27/26 |
| 2020/0358422 | A1 | 11/2020 | Northcutt et al. |
| 2021/0119602 | A1 | 4/2021 | Lu et al. |
| 2021/0119606 | A1 | 4/2021 | Lu et al. |
| 2023/0007443 | A1 | 1/2023 | Moon |
| 2023/0035736 | A1 | 2/2023 | Bingesser et al. |
| 2023/0139079 | A1 | 5/2023 | McLaughlin et al. |
| 2023/0266431 | A1 | 8/2023 | Perraud |
| 2023/0296753 | A1 | 9/2023 | Khlat et al. |
| 2024/0027576 | A1 | 1/2024 | Khlat et al. |
| 2024/0036158 | A1 | 2/2024 | Khlat |
| 2024/0103113 | A1 | 3/2024 | Qian et al. |
| 2024/0118375 | A1 | 4/2024 | Dong et al. |
| 2024/0179494 | A1 | 5/2024 | Säily et al. |
| 2024/0219559 | A1 | 7/2024 | Shin |
| 2025/0151018 | A1 | 5/2025 | Zhang et al. |

FOREIGN PATENT DOCUMENTS

| KR | 20200131526 | A | | 11/2020 | |
|---|---|---|---|---|---|
| WO | 2016138483 | A1 | | 9/2016 | |
| WO | 2020212723 | A1 | | 10/2020 | |
| WO | 2021026657 | A1 | | 2/2021 | |
| WO | WO-2021209352 | A1 | * | 10/2021 | ....... H04B 10/07955 |
| WO | 2023081158 | A1 | | 5/2023 | |

OTHER PUBLICATIONS

Verso, B. et al., "Draft text for UWB wake-up radio," IEEE P802.15 Working Group for Wireless Personal Area Networks (WPANs), Nov. 2022, 7 pages.

Extended European Search Report for European Patent Application No. 24166667.6, mailed Jul. 10, 2024, 10 pages.

Dissanayake, A. et al., "A-108dBm Sensitivity, -28dB SIR, 130nW to 41 µW, Digitally Reconfigurable Bit-Level Duty-Cycled Wakeup and Data Receiver," 2020 IEEE Custom Integrated Circuits Conference (CICC), Mar. 22-25, 2020, Boston, MA, USA, IEEE, 4 pages.

Goe, C. et al., "The Advantages of UWB Wakeup," Project: IEEE P802.15 Working Group for Wireless Specialty Networks (WSN), May 2022, IEEE, 14 pages.

Hoang, H. et al., "A Cluster-Based Protocol for Self-Organizing UWB Wireless Ad hoc Sensor Networks, Proceedings of the 2009 IEEE International Conference on Systems, Man, and Cyberneticsm" Oct. 2009, San Antonio, TX, USA, IEEE, 6 pages.

Klumperink et al., "N-path filters and Mixer-First Receivers: A Review," 2017 IEEE Custom Integrated Circuits Conference (CICC), Apr. 30, 2017-May 3, 2017, Austin, TX, USA, IEEE, 8 pages.

McLaughlin, M. et al., "UWB Wakeup Signalling," Project IEEE P802.15 Working Group, Nov. 2021, IEEE, 25 pages.

Moody, J. et al., "A-106dBm 33nW Bit-Level Duty-Cycled Tuned RF Wake-up Receiver," IEEE Solid-State Circuits Letters, vol. 2, Issue 12, Dec. 2019, IEEE, 2 pages.

Salonidis, T. et al., "Distributed Topology Construction of Bluetooth Personal Area Networks," Proceedings of IEEE INFOCOM 2001, Conference on Computer Communications, Twentieth Annual Joint Conference of the IEEE Computer and Communications Society (Cat. No. 01CH37213), Apr. 22-26, 2001, Anchorage, AK, USA, IEEE, 10 pages.

International Search Report and Written Opinion for International Patent Application No. PCT/US2022/048600, mailed Feb. 1, 2023, 17 pages.

ISO/IEC, "Information Technology—Radio Frequency Identification (RFID) for Item Management—Part 6: Parameters for Air Interface Communications at 860-930 MHz," ISO/IEC CD 18000-6, May 4, 2002, 129 pages.

Extended European Search Report for European Patent Application No. 22205008.0, mailed Mar. 9, 2023, 10 pages.

Biedka, M.M. et al., "Ultra-Wide Band Non-reciprocity through Sequentially-Switched Delay Lines," Scientific Reports, vol. 7, Article No. 40014, Jan. 2017, 16 pages.

Lee, H.L. et al., "Compact Antenna Module With Optimized Tx-to-Rx Isolation for Monostatic RFID," IEEE Microwave and Wireless Components Letters, vol. 27, No. 2, Dec. 2017, IEEE, pp. 1161-1163.

Lurz, F. et al., "Reader Architectures for Wireless Surface Acoustic Wave Sensors," Sensors, vol. 18, No. 6, May 2018, MDPI, 34 pages.

Sipos, D. et al., "SFCW Radar with an Integrated Static Target Echo Cancellation System," Sensors (Basel), vol. 21, No. 17, Sep. 2021, MDPI, 23 pages.

* cited by examiner

RECEIVER CIRCUIT FOR DETECTING AND WAKING UP TO A WAKEUP IMPULSE SEQUENCE

PRIORITY APPLICATIONS

This application claims priority to U.S. Provisional Patent Application Ser. No. 63/492,592, filed on Mar. 28, 2023, the disclosure of which is incorporated herein by reference in its entirety.

This application also claims priority to U.S. Provisional Patent Application Ser. No. 63/522,733, filed on Jun. 23, 2023, the disclosure of which is incorporated herein by reference in its entirety.

RELATED APPLICATIONS

This application is related to U.S. Provisional Patent Application Ser. No. 63/275,139, filed on Nov. 3, 2021, the disclosure of which is incorporated herein by reference in its entirety.

This application is also related to U.S. patent application Ser. No. 17/883,048, filed on Aug. 8, 2022, the disclosure of which is incorporated herein by reference in its entirety.

FIELD OF THE DISCLOSURE

The technology of the disclosure relates generally to waking up a receiver circuit via a wakeup impulse sequence, such as an ultra-wideband (UWB) wakeup sequence.

BACKGROUND

Ultra-wideband (UWB) is an Institute of Electrical and Electronic Engineers (IEEE) 802.15.4a/z standard technology optimized for secure micro-location-based applications. It is capable of measuring distance and location with extended range (e.g., up to 70 meters) and unprecedented accuracy (e.g., within a few centimeters) compared to such traditional narrowband technologies as Wi-Fi and Bluetooth. In addition to location capability, UWB can also offer a data communication pipe of up to twenty-seven megabits per second (27 Mbps). As such, UWB technology has been widely adopted in today's new smartphones and smart gadgets to enable spatial awareness in places where global positioning service (GPS) based positioning service is unavailable or unreliable and/or for fast and secure data collection from various sensors.

UWB-based positioning service is enabled by transmitting a UWB pulse from a UWB transmitter circuit (e.g., smartphone) to a UWB receiver circuit (e.g., a sensor) and calculating the time it takes the UWB pulse to travel between the transmitter circuit and the receiver circuit. The UWB pulse is typically two nanoseconds (2 ns) wide and has clean edges, thus making it highly immune to a reflected signal (e.g., multipath) and allowing a precise determination of arrival time and distance in a multipath radio environment (e.g., an indoor environment).

The UWB receiver circuit is typically powered by embedded batteries. As such, most UWB receiver circuits stay in power-saving mode (e.g., doze mode) most of the time to conserve energy and will only wake up in response to detecting a wakeup signal. A conventional UWB receiver circuit typically includes a narrowband radio circuit (e.g., Bluetooth or ZigBee) for the purpose of detecting the wakeup signal. Understandably, the additional narrowband radio circuit not only increases the footprint of the UWB receiver circuit but also contributes to increases in cost and power consumption. As such, it is desirable to wake up the UWB receiver circuit without employing the narrowband radio circuit.

SUMMARY

Aspects of the disclosure relate to a receiver circuit for detecting and waking up to a wakeup impulse sequence. In aspects disclosed herein, a transmitter circuit is configured to transmit a wakeup impulse sequence to wake up a receiver circuit. The receiver circuit includes a main receiver circuit and a wakeup receiver circuit. The main receiver circuit, which consumes far more energy than the wakeup receiver circuit, will remain in sleep mode as much as possible to conserve power. While the main receiver circuit is asleep, the wakeup receiver circuit is configured to detect the wakeup impulse sequence and wake up the main receiver circuit if the wakeup impulse sequence is intended for the receiver circuit. In addition, the circuit includes a verification step that precludes the main receiver wakeup from a false detection. More specifically, the verification step checks to see that the signal being treated as the wakeup impulse sequence ends at an appropriate time. If the signal being treated as the wakeup impulse sequence has not ended, the initial determination is considered to be a false positive, and the main receiver circuit remains asleep. By keeping the main receiver circuit asleep as much as possible, it is possible to reduce power consumption, thus making the receiver circuit an ideal receiver option for an Internet-of-Things (IoT) device(s).

In one aspect, a receiver device is disclosed. The receiver device includes receive circuitry comprising a main receiver circuit and a wakeup receiver circuit. The receive circuitry is configured to: receive a possible wakeup impulse sequence, determine that the possible wakeup impulse sequence is a wakeup impulse sequence by verifying that the possible wakeup impulse sequence includes a first pulse burst that ends at an expected time, and evaluate the wakeup impulse sequence to determine a preamble, a start frame delimiter (SFD), and an address within the wakeup impulse sequence, wherein: the preamble comprises a plurality of preamble symbols, and each of the plurality of preamble symbols comprises a corresponding pulse burst; the SFD comprises a start bit symbol, and the address comprises a plurality of address symbols modulated to represent an identification of the receiver device.

In another aspect, a method of operating a receiver circuit is disclosed. The method includes receiving a possible wakeup impulse sequence from a transmitter device and determining that the possible wakeup impulse sequence is a wakeup impulse sequence by verifying that the possible wakeup impulse sequence includes a first pulse burst that ends at an expected time. The method also includes evaluating the wakeup impulse sequence to determine a preamble, a start frame delimiter (SFD), and an address within the wakeup impulse sequence, wherein the preamble comprises a plurality of preamble symbols, each of the plurality of preamble symbols comprises a corresponding pulse burst, the SFD comprises a start bit symbol, and the address comprises a plurality of address symbols modulated to represent an identification of the receiver circuit.

In another aspect, a wireless communication device is disclosed. The wireless communication device includes a baseband processor (BBP) and a transmitter coupled to the BBP and configured to transmit a transmitted wakeup impulse sequence to a receiver device wherein the transmitted wakeup impulse sequence comprises a preamble, a start frame delimiter (SFD), and an address, wherein the preamble comprises a plurality of preamble symbols, each of the plurality of preamble symbols comprises a pulse burst, the SFD comprises a start bit symbol, and the address comprises a plurality of address symbols modulated to represent an identification of the receiver device; and receive circuitry coupled to the BBP, the receive circuitry comprising: a main receiver circuit; and a wakeup receiver circuit, the configured to: receive a possible wakeup impulse sequence, determine that the possible wakeup impulse sequence is a received wakeup impulse sequence by verifying that the possible wakeup impulse sequence includes a first pulse burst that ends at an expected time, and evaluate the received wakeup impulse sequence to determine a receive preamble, a receive SFD, and a receive address within the received wakeup impulse sequence.

In another aspect, a receiver circuit is disclosed. The receiver circuit includes a main receiver circuit and a wakeup receiver circuit configured to detect a possible wakeup impulse sequence received by an antenna circuit, verify that the possible wakeup impulse sequence includes a first pulse burst of a plurality of pulse bursts, wherein the first pulse burst ends at an expected time, determine whether the possible wakeup impulse sequence is a wakeup impulse sequence intended to wake up the receiver circuit and wake up the main receiver circuit in the receiver circuit in response to determining that the wakeup impulse sequence is intended to wake up the receiver circuit.

In another circuit, a receiver circuit is disclosed. The receiver circuit includes a main receiver circuit and a wakeup receiver circuit configured to detect a possible wakeup impulse sequence received by an antenna circuit, verify that the possible wakeup impulse sequence includes a first pulse burst of a plurality of pulse bursts wherein the first pulse burst that starts and ends within an expected interval, and determine whether the possible wakeup impulse sequence is a wakeup impulse sequence intended to wake up the receiver circuit and wake up the main receiver circuit in the receiver circuit in response to determining that the wakeup impulse sequence is intended to wake up the receiver circuit.

In another aspect, a method of reducing power consumption is disclosed. The method includes at a wakeup receiver circuit in a receiver circuit, detecting a possible wakeup impulse sequence received by an antenna circuit, verifying that the possible wakeup impulse sequence includes a first pulse burst of a plurality of pulse bursts, wherein the first pulse that ends at an expected time, determining whether the possible wakeup impulse sequence is a wakeup impulse sequence intended to wake up the receiver circuit, and waking up a main receiver circuit responsive to the determining.

In another aspect, a mobile terminal is disclosed. The mobile terminal includes a baseband processor, a transmitter configured to transmit a transmit wakeup impulse sequence and a receiver circuit. The receiver circuit includes a main receiver circuit and a wakeup receiver circuit comprising a main receiver circuit and a wakeup receiver circuit. The wakeup receiver circuit is configured to detect a possible wakeup impulse sequence received by an antenna circuit, and verify that the possible wakeup impulse sequence includes a first pulse burst of a plurality of pulse bursts, wherein the first pulse burst ends at an expected time, determine whether the possible wakeup impulse sequence is a wakeup impulse sequence intended to wake up the receiver circuit and wake up the main receiver circuit in the receiver circuit in response to determining that the wakeup impulse sequence is intended to wake up the receiver circuit.

Those skilled in the art will appreciate the scope of the present disclosure and realize additional aspects thereof after reading the following detailed description of the aspects in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
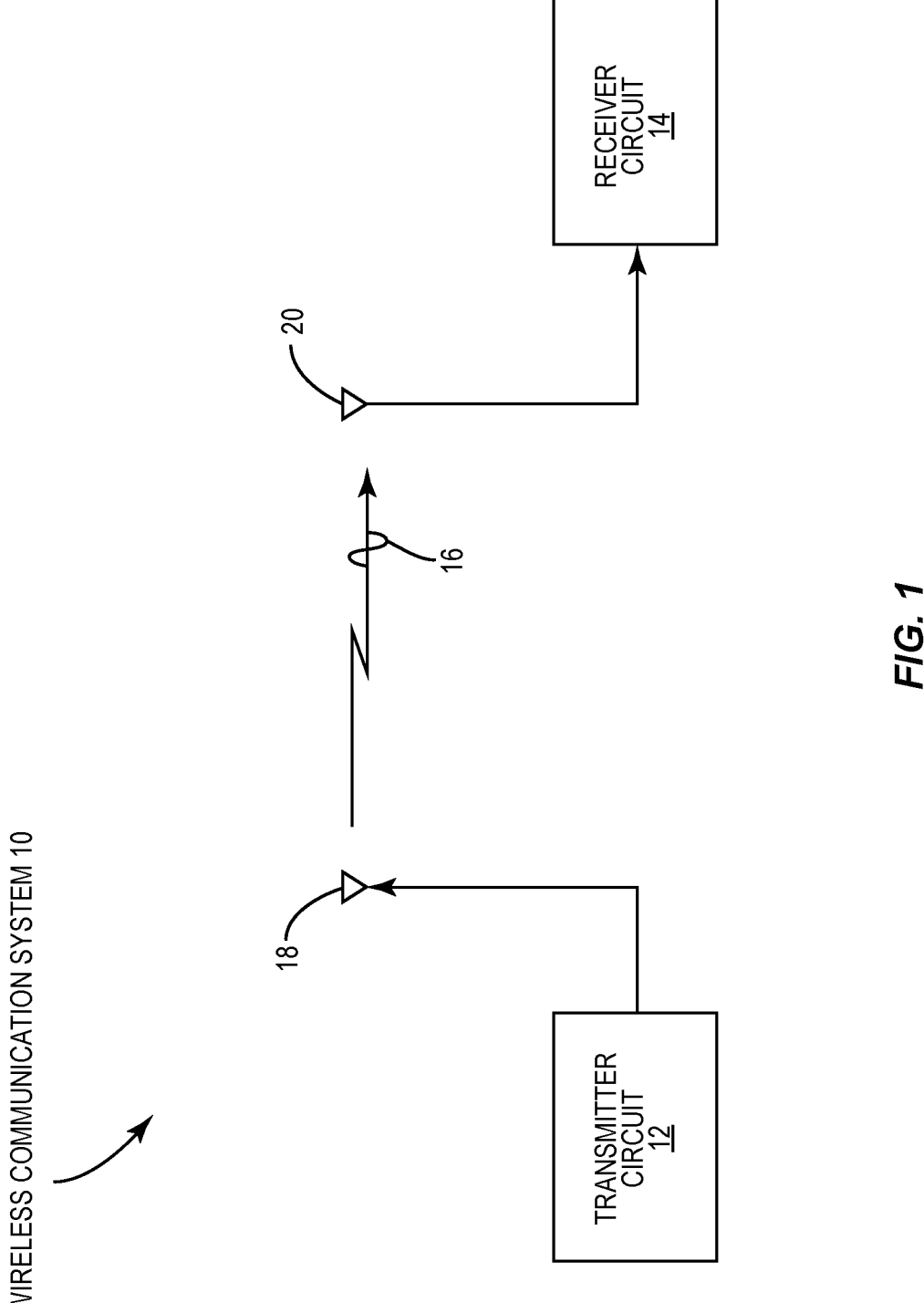
FIG. 1 is a schematic diagram of an exemplary wireless communication system wherein a transmitter circuit is configured according to aspects of the present disclosure to wake up a receiver circuit via a wakeup impulse sequence.

The aspects set forth below represent the necessary information to enable those skilled in the art to practice the aspects and illustrate the best mode of practicing the aspects. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In keeping with the above admonition about definitions, the present disclosure uses transceiver in a broad manner. Current industry literature uses "transceiver" in two ways. The first way uses transceiver broadly to refer to a plurality of circuits that send and receive signals. Exemplary circuits may include a baseband processor, an up/down conversion circuit, filters, amplifiers, couplers, and the like coupled to one or more antennas. A second way, used by some authors in the industry literature, refers to a circuit positioned between a baseband processor and a power amplifier circuit as a transceiver. This intermediate circuit may include the up/down conversion circuits, mixers, oscillators, filters, and the like but generally does not include the power amplifiers. As used herein, the term transceiver is used in the first sense. Where relevant to distinguish between the two definitions, the terms "transceiver chain" and "transceiver circuit" are used respectively.

Further, as used herein, the term "approximately" means within five percent (5%).

Aspects of the disclosure relate to a receiver circuit for detecting and waking up to a wakeup impulse sequence. In aspects disclosed herein, a transmitter circuit is configured to transmit a wakeup impulse sequence to wake up a receiver circuit. The receiver circuit includes a main receiver circuit and a wakeup receiver circuit. The main receiver circuit, which consumes far more energy than the wakeup receiver circuit, will remain in sleep mode as much as possible to conserve power. While the main receiver circuit is asleep, the wakeup receiver circuit is configured to detect the wakeup impulse sequence and wake up the main receiver circuit if the wakeup impulse sequence is intended for the receiver circuit. In addition, the circuit includes a verification step that precludes main receiver wakeup from a false detection. More specifically, the verification step checks to see that the signal being treated as the wakeup impulse sequence ends at an appropriate time. If the signal being treated as the wakeup impulse sequence has not ended, the initial determination is considered to be a false positive, and the main receiver circuit remains asleep. By keeping the main receiver circuit asleep as much as possible, it is possible to reduce power consumption, thus making the receiver circuit an ideal receiver option for an Internet-of-Things (IoT) device(s).

FIG. 1 is a schematic diagram of an exemplary wireless communication system 10 wherein a transmitter circuit 12 is configured according to aspects of the present disclosure to wake up a receiver circuit 14 via a wakeup impulse sequence 16. The transmitter circuit 12 can be configured to transmit the wakeup impulse sequence 16 via a transmit antenna circuit 18, and the receiver circuit 14 can be configured to receive the wakeup impulse sequence 16 via a receive antenna circuit 20. Notably, each of the transmit antenna circuit 18 and the receive antenna circuit 20 can include one or more antennas of any suitable type and be arranged in any suitable configuration.

Figure 2A:
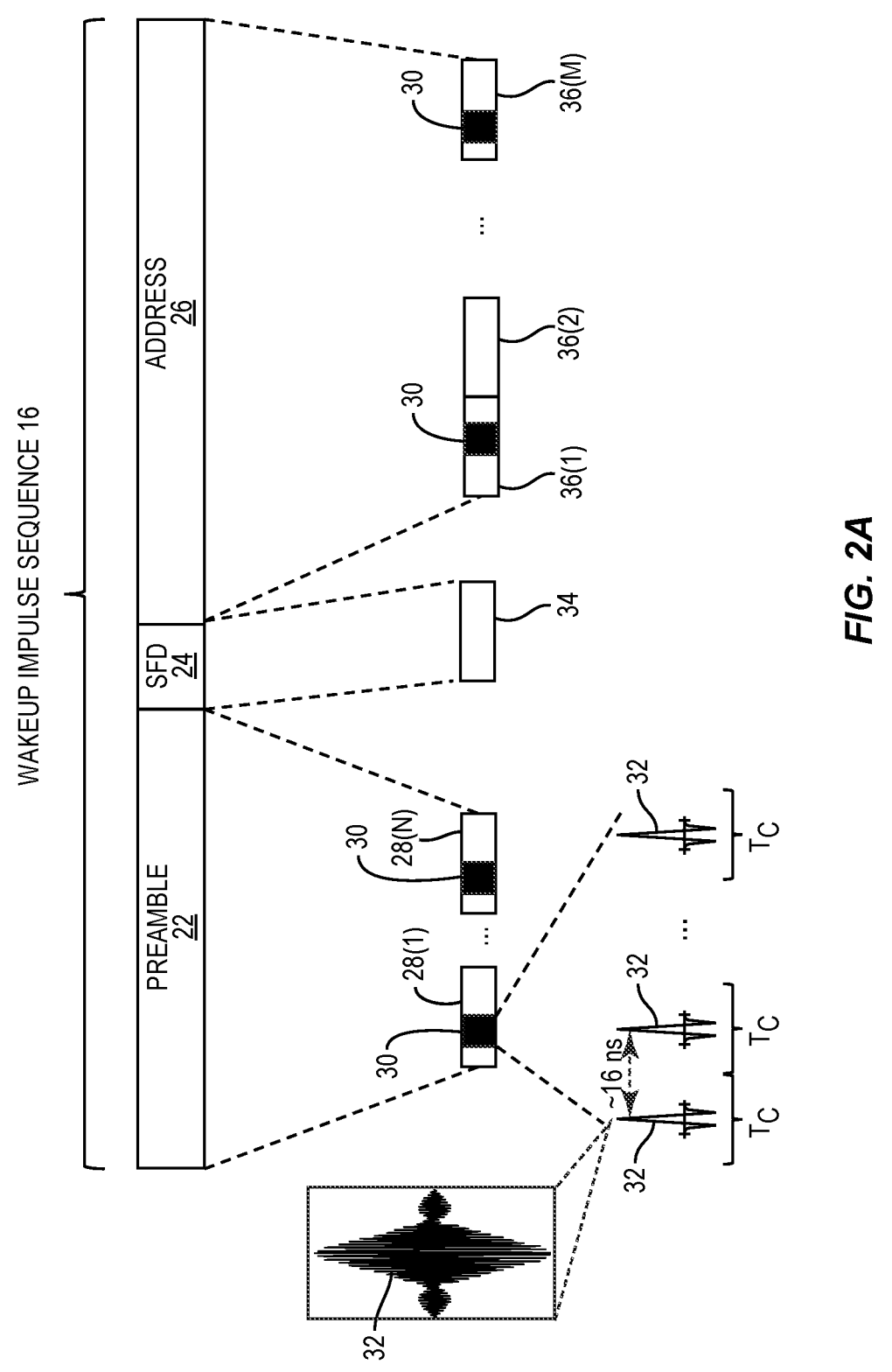
FIGS. 2A and 2B are examples of the wakeup impulse sequence in FIG. 1.

The wakeup impulse sequence 16 is a special sequence for waking up the receiver circuit 14. FIG. 2A is a block diagram illustrating a general structure of the wakeup impulse sequence 16 in FIG. 1.

Specifically, the wakeup impulse sequence 16 includes a preamble 22 (sometimes referred to as a synchronization section or just SYNC), a start frame delimiter (SFD) 24 (a.k.a. start bit), and an address 26 (sometimes referred to as an identifier). The preamble 22 includes multiple preamble symbols 28(1)-28(N). In a non-limiting example, each of the preamble symbols 28(1)-28(N) has a symbol duration of approximately one millisecond (1 ms). Each of the preamble symbols 28(1)-28(N) includes a pulse burst 30. In a non-limiting example, the pulse burst 30 has a burst duration of approximately four microseconds (4 μs), which is substantially shorter (0.4% or $\frac{1}{250}$) than the symbol duration. In another non-limiting example, the pulse burst 30 has a burst duration of approximately eight microseconds (8 μs), which is still substantially shorter (0.8% or $\frac{1}{125}$) than the symbol duration. The pulse burst 30 can be divided into multiple chip intervals $T_C$, each having a chip duration of approximately sixteen nanoseconds (16 ns). Each of the chip intervals $T_C$ can further include a pulse 32 that is approximately two nanoseconds (2 ns) in duration. The exact choice of the chip interval $T_C$ may not be important, but by design, the chip interval $T_C$ is constant during the pulse burst 30. A constant chip interval $T_C$ results in a very narrow detection frequency with corresponding harmonics to be produced by the wakeup signal detector circuit 50 (described below in FIG. 4) and concentrates the energy into a small spectral region and the corresponding harmonics. The usual choice of preamble sequence for UWB is an Ipatov sequence (e.g., in 802.15.4a and 802.15.4z). However, an Ipatov sequence does not use a constant chip interval $T_C$ between pulses and, as a result, would not perform as well as the aspects disclosed herein (e.g., using a sequence with a constant chip interval $T_C$ between pulses). The polarity of the pulses does not affect the output of an envelope detector of the wakeup signal detector circuit 50 and so may be chosen by using many of the well-known sequences that provide good spectral whitening (e.g., m-sequences). In this regard, the pulses 32 in the pulse burst 30 are spaced at approximately 16 ns. Each of the pulses 32 in the pulse burst 30 may be Gaussian-shaped pulses.

The SFD 24 includes a single start bit symbol 34, and the address 26 includes multiple address symbols 36(1)-36(M). Like the preamble symbols 28(1)-28(N), each of the single start bit symbol 34 and the address symbols 36(1)-36(M) is also 1 ms in duration. In a non-limiting example, the preamble symbols 28(1)-28(N), the single start bit symbol 34, and the address symbols 36(1)-36(M) are all modulated based on an on-off-key (OOK) modulation. In this regard, a presence of the pulse burst 30 in any of the preamble symbols 28(1)-28(N), the single start bit symbol 34, and the address symbols 36(1)-36(M) would represent a binary one "1." In contrast, an absence of the pulse burst 30 in any of the preamble symbols 28(1)-28(N), the single start bit symbol 34, and the address symbols 36(1)-36(M) would represent a binary zero "0."

In an alternate aspect, the modulation may be a burst position modulation (BPM) where a binary 1 is sent by having a pulse burst 30 in a first position, and a binary 0 is sent by having a pulse burst in a second position.

Figure 2B:
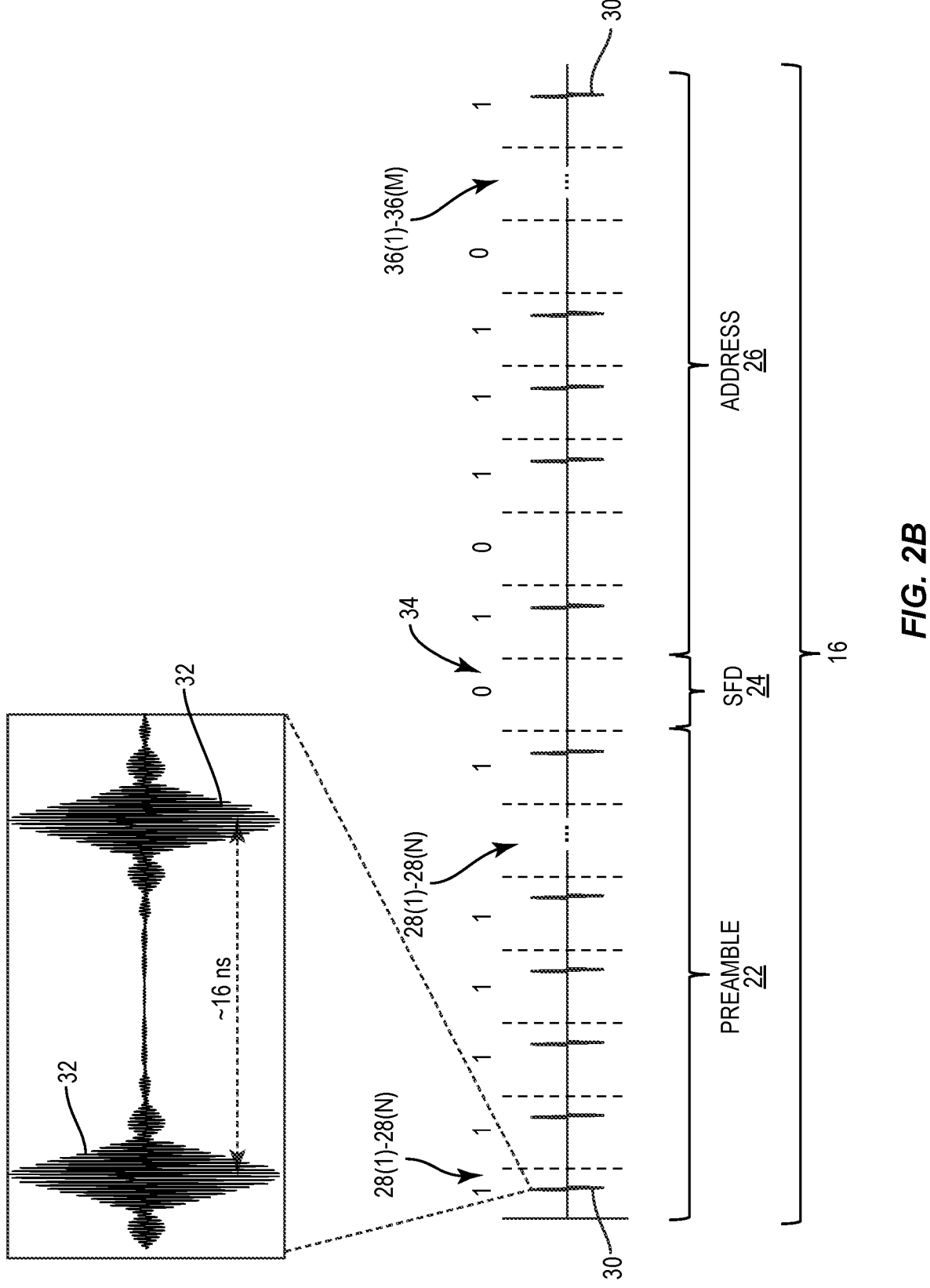

FIG. 2B is an example of the wakeup impulse sequence 16 of FIG. 2A configured according to an aspect of the present disclosure. Common elements between FIGS. 2A and 2B are shown therein with common element numbers and will not be re-described herein.

Herein, each of the preamble symbols 28(1)-28(N) is OOK modulated to include the pulse burst 30, while the start bit symbol 34 is OOK modulated not to include the pulse burst 30, such that a binary 0 is sent. In this regard, each of the preamble symbols 28(1)-28(N) is modulated to represent the binary "1," and the start bit symbol 34 is modulated to represent the binary "0." In a non-limiting example, the preamble 22 can include twenty (20) consecutive preamble symbols 28(1)-28(20) to thereby provide the preamble 22 with twenty consecutive binary "1s." In this regard, once the receiver circuit 14 detects the binary "0" after multiple consecutive binary "1s," it is an indication of the SFD 24.

Each of the address symbols 36(1)-36(M), on the other hand, can be OOK modulated to include or not include the pulse burst 30. The address 26 may include any number of the address symbols 36(1)-36(M), which can be preprogrammed in the receiver circuit 14. In this regard, the receiver circuit 14 can detect the preprogrammed number of the address symbols 36(1)-36(M) after detecting the start bit symbol 34. The address 26 in the wakeup impulse sequence 16 indicates a receiver identification of the receiver circuit the transmitter circuit 12 intends to wake up via the wakeup impulse sequence 16. To differentiate from the preamble 22, which includes consecutive binary "1s," the address 26 may include some form of coding redundancy (e.g., parity, cyclic redundancy check, etc.).

In this regard, the transmitter circuit 12 is configured to transmit the pulse burst in each of the preamble symbols 28(1)-28(20). The transmitter circuit 12 may apply an extra gain of 24 dB in the example where the burst duration is 4 μs or 21 dB in the example where the burst duration is 8 μs to the wakeup impulse sequence 16 to boost an average power of the wakeup impulse sequence 16 to, for example, −14.3 dBm. The transmitter circuit 12 may also generate the pulse burst 30 in the preamble symbols 28(1)-28(20) in pseudo-random polarity and with good auto-correlation properties. In this regard, for the example where the burst duration is 4 μs since each of the preamble symbols 28(1)-28(20) can accommodate up to 250 pulses 32 in the burst 30, the pulse burst 30 in each of the preamble symbols 28(1)-28(20) can carry 37 nanojoules (nJ) of energy, and as a result, each pulse 32 can carry up to 148 picojoules (pJ). Also, in this regard, for the example where the burst duration is 8 μs, each of the preamble symbols 28(1)-28(20) can accommodate up to 500 pulses 32 in the burst 30, the pulse burst 30 in each of the preamble symbols 28(1)-28(20) can carry 37 nanojoules (nJ) of energy, and as a result each pulse 32 can carry up to 74 picojoules (pJ). The choice of burst length may be a tradeoff. The shorter the burst, the more energy that can be imparted to the individual pulses 32 and the greater the range, but this may be limited in practice by the achievable pulse power that the circuitry can deliver, and as a result, the longer burst may be preferable despite the reduced range.

Figure 3:
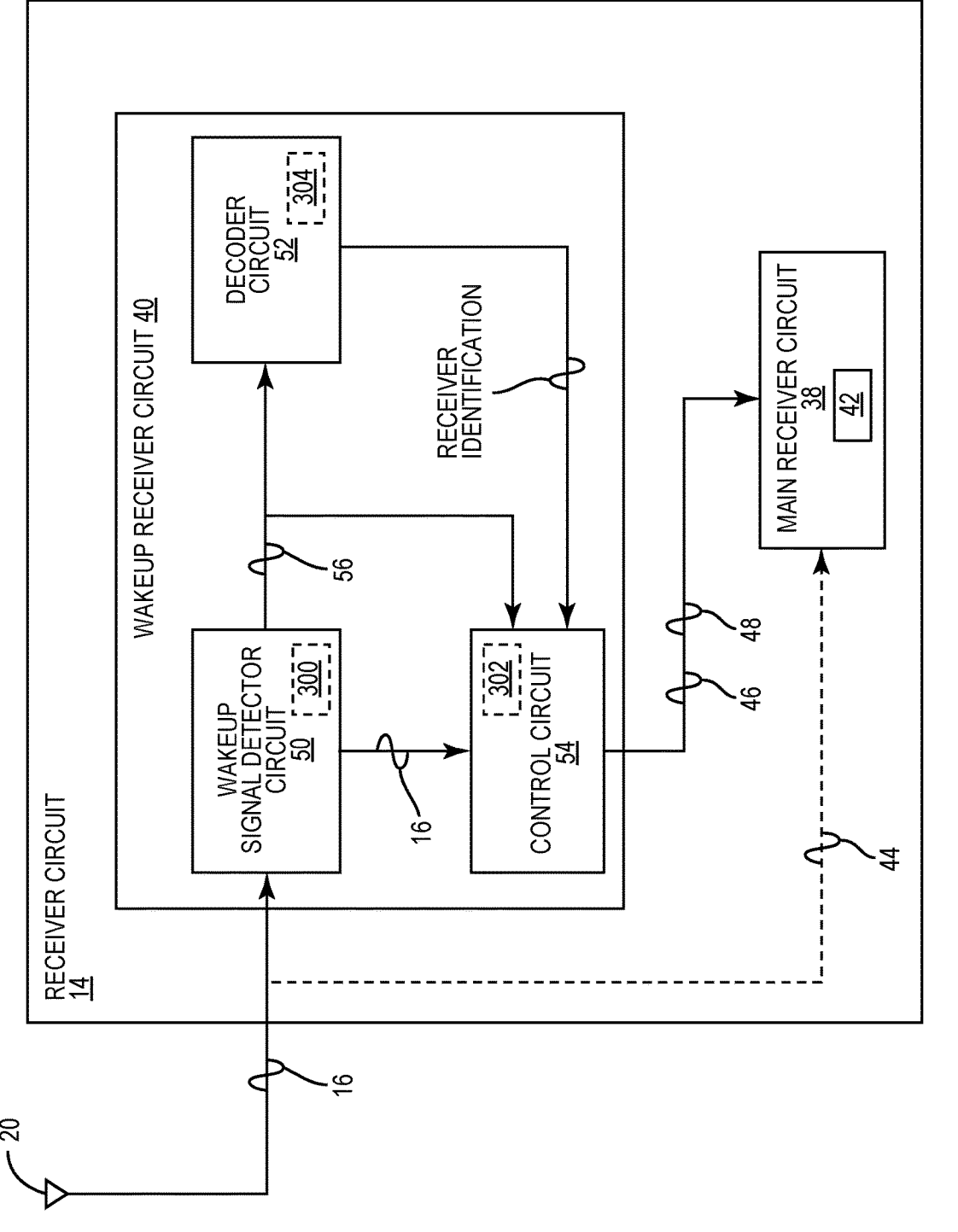
FIG. 3 is a block diagram providing an exemplary illustration of the receiver circuit in the wireless communication system of FIG. 1.

FIG. 3 is a block diagram providing an exemplary illustration of the receiver circuit 14 in the wireless communication system 10 of FIG. 1. Common elements between FIGS. 1 and 3 are shown therein with common element numbers and will not be re-described herein.

The receiver circuit 14 includes a main receiver circuit 38 and a wakeup receiver circuit 40. The main receiver circuit 38 implements ultra-wideband (UWB) physical (PHY) and medium access control (MAC) layer protocols as defined in the Institute of Electrical and Electronic Engineers (IEEE) 802.15.4a/z standard. In this regard, the main receiver circuit 38 is a UWB receiver circuit, which implements a UWB protocol stack 42 and is operable to receive a UWB signal 44. Since the main receiver circuit 38 supports the entire UWB protocol stack 42, the main receiver circuit 38 will understandably consume more energy (a.k.a. battery power) whenever the main receiver circuit 38 is active and operational. As such, it is desirable to keep the main receiver circuit 38 in sleep mode (a.k.a. power saving) as much as possible, only to be woken up as necessary.

The wakeup receiver circuit 40, on the other hand, will consume far less energy than the main receiver circuit 38. As such, the wakeup receiver circuit 40 will be operational to monitor the wakeup impulse sequence 16 transmitted from the transmitter circuit 12. In an aspect, the wakeup receiver circuit 40 may wake up periodically to detect the wakeup impulse sequence 16 to help further reduce power consumption of the receiver circuit 14.

When the wakeup receiver circuit 40 detects the wakeup impulse sequence 16, the wakeup receiver circuit 40 will attempt to decode the address 26 in the wakeup impulse sequence 16 to determine whether the wakeup impulse sequence 16 is intended to wake up the receiver circuit 14. When the wakeup receiver circuit 40 determines that the wakeup impulse sequence 16 is indeed intended to wake up the receiver circuit 14, the wakeup receiver circuit 40 will generate a wakeup signal 46 to wake up the main receiver circuit 38. By keeping the main receiver circuit 38 asleep as much as possible, it is possible to reduce power consumption, thus making the receiver circuit 14 an ideal receiver option for an IoT device(s).

In an aspect, the wakeup receiver circuit 40 may be turned off when the main receiver circuit 38 is operational. In this regard, the main receiver circuit 38 may send an indication signal 48 to wake up the wakeup receiver circuit 40 when the main receiver circuit 38 is returning to the sleep mode.

In an aspect, the wakeup receiver circuit 40 includes a wakeup signal detector circuit 50, a decoder circuit 52, and a control circuit 54. The wakeup signal detector circuit 50 is configured to detect the preamble symbols 28(1)-28(N), the start bit symbol 34, and the address symbols 36(1)-36(M) in the wakeup impulse sequence 16. In an aspect, the wakeup signal detector circuit 50 is configured to output a signal detection indication 56 to indicate to the decoder circuit 52 and the control circuit 54 as to whether the pulse burst is present or absent in any of the preamble symbols 28(1)-28(N), the start bit symbol 34, and the address symbols 36(1)-36(M). The decoder circuit 52 is configured to decode the address 26 based on a presence or absence of the pulse burst 30 in the address symbols 36(1)-36(M) to obtain the receiver identification and send the obtained receiver identification to the control circuit 54.

The control circuit 54, which can be a synthesized logic, as an example, is configured to check the receiver identification indicated by the address 26 to determine whether the wakeup impulse sequence 16 is intended to wake up the receiver circuit 14. If the receiver identification indicated by the address 26 matches the identification of the receiver circuit 14, the control circuit 54 can conclude that the wakeup impulse sequence 16 is intended to wake up the receiver circuit 14. Accordingly, the control circuit 54 can generate the wakeup signal 46 to wake up the main receiver circuit 38.

As mentioned earlier, the wakeup receiver circuit 40 may be turned on periodically or when the main receiver circuit 38 returns to the sleep mode. Moreover, the wakeup receiver circuit 40 may not have an internal clock that is precisely synchronized with a clock in the transmitter circuit 12. As such, the wakeup receiver circuit 40 may be turned on anywhere during the preamble 22. In other words, the wakeup receiver circuit may not always be turned on exactly at the start of the first preamble symbol 28(1). In addition, since the duration of the pulse burst 30 is far shorter than the duration of any of the preamble symbols 28(1)-28(N), the wakeup receiver circuit 40 may not know where exactly the pulse burst 30 is located inside any of the preamble symbols 28(1)-28(N).

Fortunately, the aspect disclosed herein does not require the wakeup receiver circuit 40 to detect all the preamble symbols 28(1)-28(N). In fact, the wakeup receiver circuit 40 can still carry out the intended operation by detecting a subset of the preamble symbols 28(1)-28(N). As such, whenever the wakeup receiver circuit 40 is turned on, the wakeup signal detector circuit 50 must stay on long enough to detect the pulse burst 30 in any of the preamble symbols 28(1)-28(N). Thereafter, the wakeup signal detector circuit 50 can correctly detect the remaining preamble symbols among the preamble symbols 28(1)-28(N), the start bit symbol 34, and the address symbols 36(1)-36(M).

Suppose that the preamble 22 includes twenty preamble symbols 28(1)-28(20) and the wakeup receiver circuit 40 is turned on during or slightly before the preamble symbol 28(10). The wakeup signal detector circuit 50 will stay on until the pulse burst 30 in the preamble symbol 28(10) (also referred to as "first preamble symbol" in this example) is detected. Accordingly, the wakeup signal detector circuit 50 can output the signal detection indication 56 to indicate the presence of the pulse burst 30 in the preamble symbol 28(10). Additional false positive detection circuit 300 may be present in the signal detector circuit 50. Alternatively, there may be a false positive detection circuit 302 in the control circuit 54. Likewise, the decoder circuit 52 may have a false positive detection circuit 304. The false positive detection circuits 300, 302, and 304 are discussed in greater detail below with reference to FIG. 6.

In an aspect, the pulse burst 30 may be modulated at a substantially identical location in each of the preamble symbols 28(1)-28(20). As such, after detecting the first pulse burst 30 in the preamble symbol 28(10), the control circuit 54 may estimate a predicted location of the pulse burst 30 in each of the subsequent preamble symbols 28(11)-28(20) and determine a power-saving duty cycle based on the predicted location of the pulse burst 30 in the subsequent preamble symbols 28(11)-28(20). Accordingly, the control circuit 54 can cause the wakeup signal detector circuit 50 to sleep in between the pulse burst 30 in the subsequent preamble symbols 28(11)-28(20) to further reduce power consumption. In an aspect, the control circuit 54 may cause the wakeup signal detector circuit 50 to wake up slightly ahead of the predicted location of the pulse burst 30 in each of the subsequent preamble symbols 28(11)-28(20) to account for potential jitter of the pulse burst 30.

Figure 4:
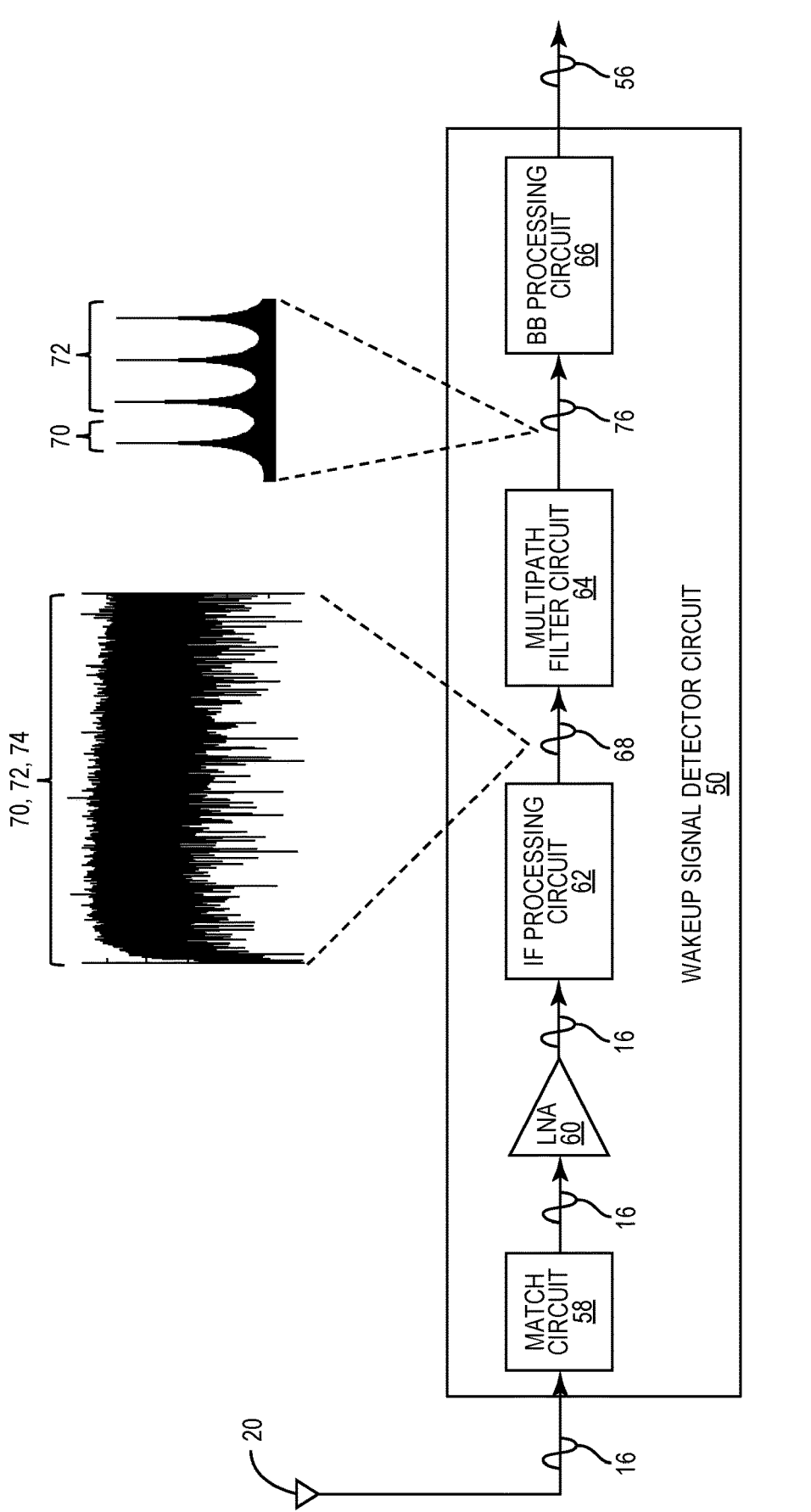
FIG. 4 is a block diagram of an exemplary wakeup signal detector circuit, which can be provided in the receiver circuit in FIGS. 1 and 3 to detect the wakeup impulse sequence.

FIG. 4 is a block diagram providing an exemplary illustration of the wakeup signal detector circuit 50 in the receiver circuit 14 of FIG. 3. Common elements between FIGS. 3 and 4 are shown therein with common element numbers and will not be re-described herein.

In an aspect, the wakeup signal detector circuit 50 includes a match circuit 58, a low-noise amplifier (LNA) 60, an intermediate frequency (IF) processing circuit 62, a multipath filter circuit 64, and a baseband processing circuit 66. The match circuit 58 is coupled to the antenna circuit 20 to receive the wakeup impulse sequence 16, and impedance match the antenna circuit 20 to the LNA 60. The LNA 60 is configured to amplify the wakeup impulse sequence 16. The IF processing circuit 62 is configured to convert the wakeup impulse sequence 16 into a multi-tone IF signal 68. In a non-limiting example, an envelope detector (not shown) may be provided in the IF processing circuit 62 to convert the RF signal portion of the wakeup impulse sequence 16 into the multi-tone IF signal 68. Notably, since the multi-tone IF signal 68 has a narrower bandwidth (e.g., 250 KHz) compared to a much wider bandwidth (e.g., 500 MHZ) of the wakeup impulse sequence 16, the multi-tone IF signal 68 can be rich in harmonics and include a large amount of noise. In this regard, the multi-tone IF signal 68, as generated by the IF processing circuit 62, can be a multi-tone signal that includes not only a fundamental response 70 but also multiple harmonic responses 72 and a noise response 74.

In a conventional system, the harmonic responses 72 are deemed undesirable and typically suppressed. However, in the context of the present disclosure, some of the harmonic responses 72 may be preserved such that the respective response energy of the preserved harmonic responses 72 can be summed for the benefit of improved pulse detection sensitivity.

In an aspect, the multipath filter circuit 64 can be configured to eliminate one or more of the harmonic responses 72 and suppress the noise response 74 in the multi-tone IF signal 68. Specifically, the multipath filter circuit 64 is configured to output a filtered IF signal 76, which is also a multi-tone IF signal that includes the fundamental response 70 and a subset (e.g., up to the third order harmonic) of the harmonic responses 72. The baseband processing circuit 66 will then generate the signal detection indication 56 that indicates the presence or absence of the pulse burst 30 in any of the preamble symbols 28(1)-28(N), the start bit symbol 34, and the address symbols 36(1)-36(M).

Figure 5:
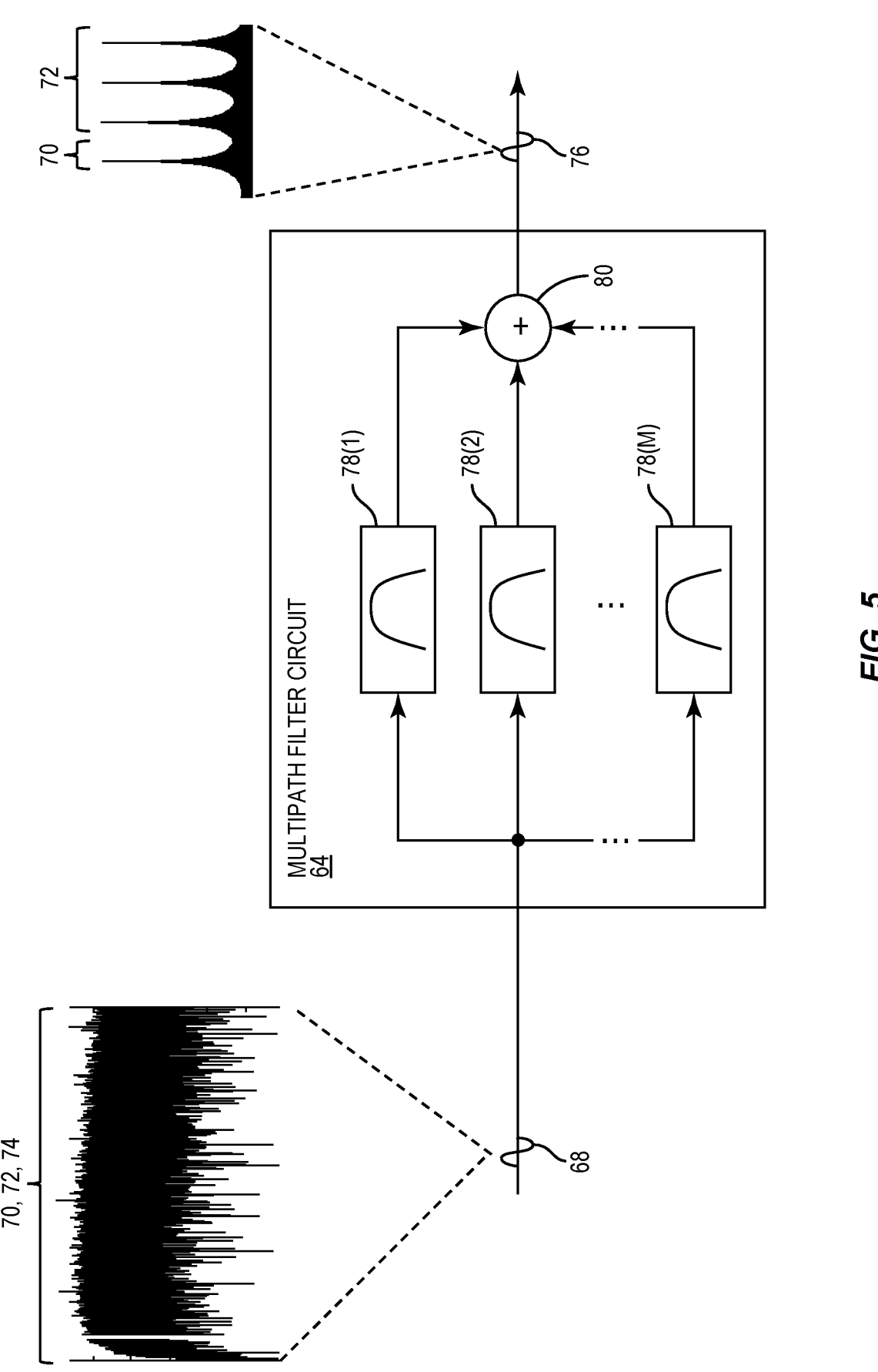
FIG. 5 is a schematic diagram of a multipath filter circuit, which can be provided in the wakeup signal detector circuit of FIG. 4.

The multipath filter circuit 64 can be configured according to different aspects of the present disclosure. FIG. 5 is a schematic diagram of the multipath filter circuit 64 configured according to an aspect of the present disclosure. Common elements between FIGS. 4 and 5 are shown therein with common element numbers and will not be re-described herein.

In this aspect, the multipath filter circuit 64 can be configured to include multiple BPFs 78(1)-78(M). Each of the BPFs 78(1)-78(M) is tuned to pass a respective one of the fundamental responses 70 and the subset of the harmonic responses 72. For example, if the filter IF signal 76 includes three of the harmonic responses 72 in addition to the fundamental response 70, there will be four BPFs 78(1)-78 (4) in the multipath filter circuit 64. Besides passing the fundamental response 70 and the subset of the harmonic responses 72, the BPFs 78(1)-78(M) eliminate or substantially suppress the noise response 74.

The multipath filter circuit 64 also includes a combiner 80. The combiner 80 is coupled to the BPFs 78(1)-78(M) and is configured to combine the respective response energy of the fundamental response 70 and the subset of the harmonic responses 72 in the filtered IF signal 76.

In an alternative aspect, the multipath filter circuit 64 may also be implemented by an N-path filter, which is inherently capable of eliminating the noise response 74 and combining the respective response energy of the fundamental response 70 and the subset of the harmonic responses 72 in the filtered IF signal 76.

While the discussion above sets forth a coherent approach to the detection of the wakeup impulse sequence 16, there may be occasions where general UWB traffic may share a pulse repetition frequency (PRF) with the wakeup impulse sequence. This shared PRF may occur naturally at the 1 ms interval since 1 ms corresponds to the period used for regulatory UWB mean power limits. When such general traffic is detected, the control circuit 54 may incorrectly send a wakeup signal 46 to the main receiver circuit 38, resulting in extra power consumption as the main receiver circuit 38 is activated unnecessarily. Accordingly, exemplary aspects of the present disclosure add a check to verify that the wakeup bursts are of the expected length (e.g., that the first detected burst does not continue past the expected duration of 8 microseconds) and that subsequent bursts are seen to begin and end at expected times. Note that aspects of the present disclosure also work where the burst is an OOK binary zero (i.e., the absence of a burst).

Figure 6:
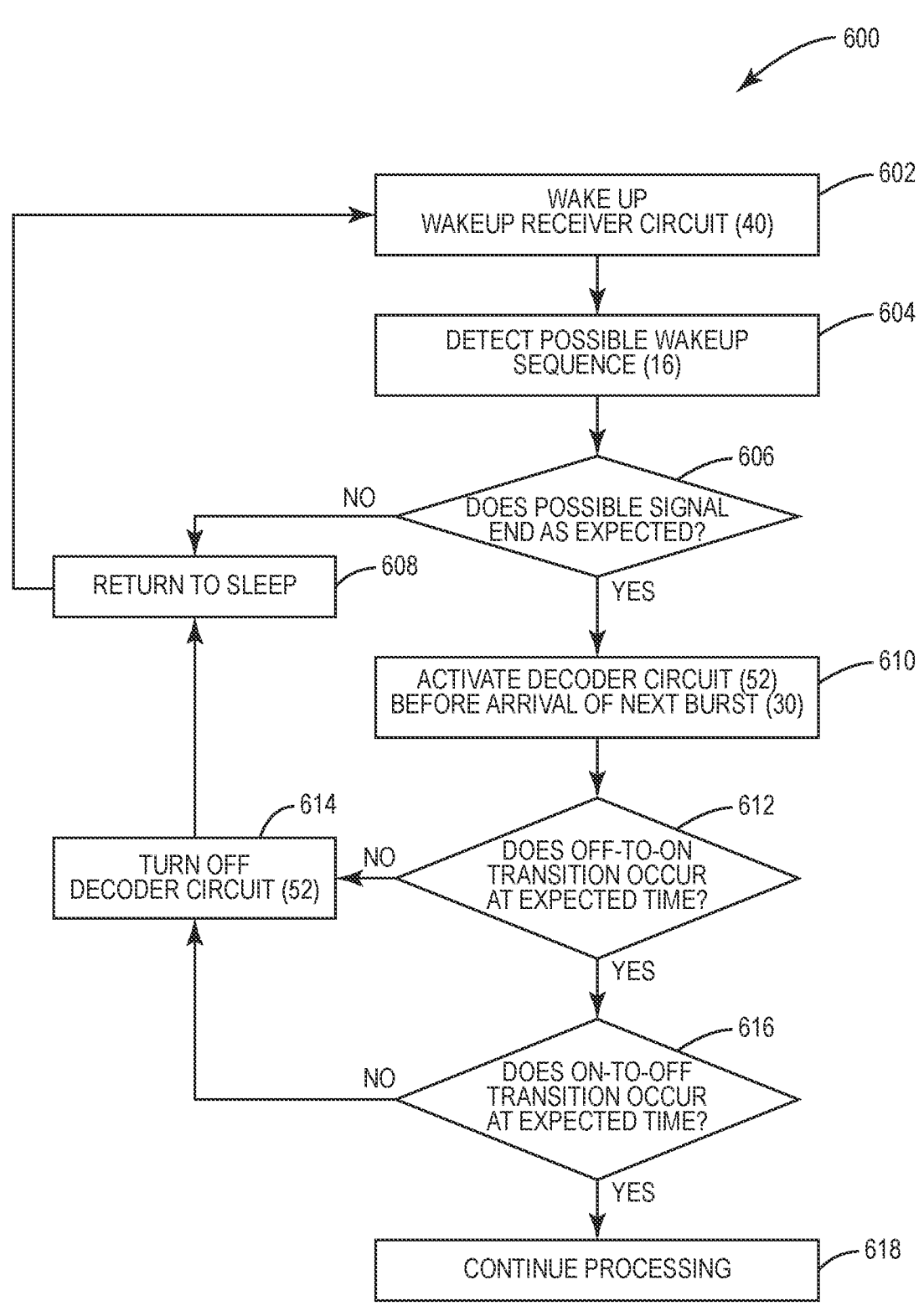
FIG. 6 is a flowchart of a process associated with verifying the wakeup impulse sequence to detect false positives.

In this regard, FIG. 6 provides a flowchart of a process 600 that includes the additional checks. The process 600 begins by waking up the wakeup receiver circuit 40 (block 602). As noted above, this wakeup may occur periodically or when the main receiver circuit 38 enters a sleep mode. The wakeup receiver circuit 40 detects a possible wakeup impulse sequence 16 (block 604). The false positive detection circuit 300 of the wakeup signal detector circuit 50 may then determine if the possible signal ends when expected (block 606). Alternatively, this determination may be made in the false positive detection circuit 302 of the control circuit 54 based on information provided in the signal detection indication 56. In an exemplary aspect, the determination is based on whether the pulse burst 30 continues longer than 8 microseconds. This threshold may be adjusted to include any additional leeway that may be needed for the performance of the detector.

If the answer to block 606 is no, the pulse burst 30 did not end when expected, the wakeup receiver circuit 40 may return to sleep (block 608) and return to block 602 on schedule. If, however, the answer to block 606 is yes, then the process 600 continues with activation of the decoder circuit 52 before the arrival of the next expected pulse burst 30 (block 610). The false positive detection circuit 300, 302,

304 determines if the off-to-on transition occurs at an expected time (block 612) for the next expected burst 30. If the answer to block 612 is no, then the detector circuit 52 is turned off (block 614), and the wakeup receiver circuit 40 returns to sleep (block 608). If, however, the answer to block 612 is yes, then the false positive detection circuit 300 determines if the on-to-off transition occurs at an expected time (block 616) for the next expected burst 30. If the answer to block 616 is no, then the decoder circuit 52 is turned off (block 614). If, however, the answer to block 616 is yes, then the processing of the wakeup impulse sequence 16 continues (block 618).

The above discussion generally assumes that the bursts are binary ones, and thus the detection of off-to-on or the on-to-off transition involves actually transitioning through a signal level change. Where the burst is an OOK binary zero (i.e., the absence of a burst), there may be no specific transition that can be detected. However, aspects of the present disclosure do accommodate such binary zeros. Thus, after activating the signal detector circuit 50 at block 610, the signal detector circuit 50 should see a burst of the correct length for a binary one or see no burst for a binary zero. The transition from block 616 to 618 is when a burst is detected and validated, and for a binary one, the signal detector circuit 50 decodes a binary one and continues processing. To handle the no-burst case and decode a binary zero, there is an intermediate step after block 610 that waits for the signal detection with a timeout, where the timeout is equal to the expected burst duration and any extra time allocated on each side for burst validation. If the timeout elapses without detecting any signal, the signal detector circuit 50 may decode a binary zero and continue processing (block 618). If, however, a burst is detected, the process 600 may continue to block 612.

Figure 7:
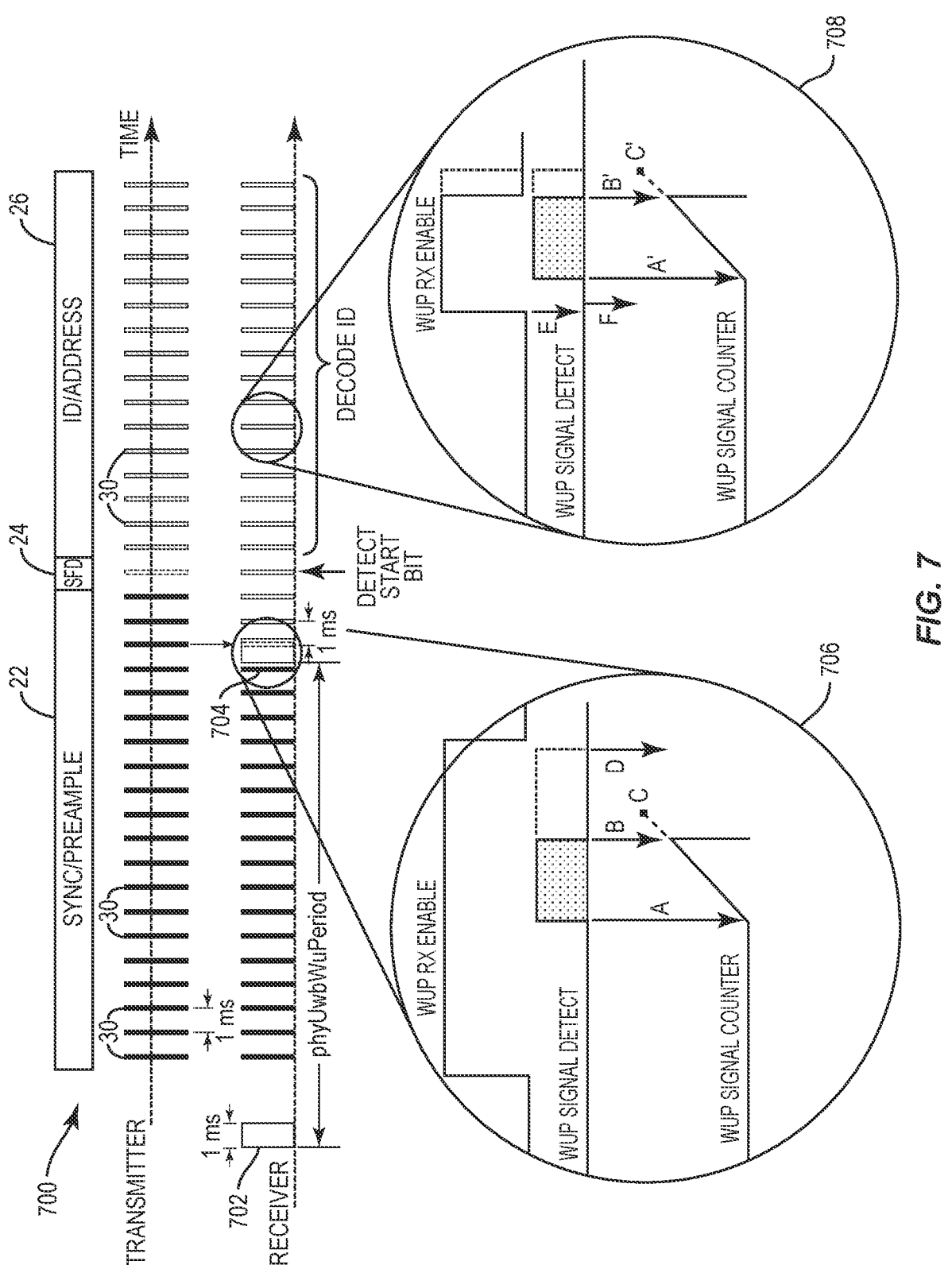
FIG. 7 is a signal timing diagram showing where steps of the process of FIG. 6 occur to facilitate false positive detection.

The wakeup windows to test for false positives according to the process 600 are illustrated in FIG. 7, where a wakeup impulse sequence 700 is being sent by the transmitter circuit 12. The wakeup impulse sequence 700 may contain a synchronization or preamble 22, a start bit (SB) or an SFD 24, and an identifier or address 26. The wakeup receiver circuit 40 wakes up periodically at times 702 and 704. This wakeup may be generated by a signal from the control circuit 54 (e.g., WUP_RX_Enable, shown in inset 706). There is no burst 30 at time 702, so the wakeup receiver circuit 40 returns to sleep until time 704. The wakeup impulse sequence 700 has already been started by the transmitter circuit 12, but a burst 30 that is part of the preamble 22 is detected. Inset 706 shows that at point A, a protection counter (e.g., WUP signal counter), which may be part of the false positive detection circuit 300 or 302, is started and subsequently stopped at point B when the wakeup signal ends. Note that if the counter is less than some expected value (e.g., 8 microseconds), the signal may be ignored as not a valid wakeup impulse sequence. Alternatively, if the detection persists and the counter reaches a value point C (e.g., 9 or 10 microseconds), the burst 30 is considered to have persisted too long to be a valid wakeup impulse sequence and will be ignored (i.e., block 606). The implementation might simply disable reception until the next wakeup period, or it may stay active to see if the false signal goes off before the normal ending of the initial sampling period (e.g., point D). This approach may be done in case there is a subsequent burst of the appropriate length in the time 702.

Inset 708 shows the second part of the process 600. That is, for each bit sampled to decode the address 26, the wakeup signal detector circuit 50 is enabled at point E, slightly before the expected burst, and the signal detector output is checked shortly thereafter at point F to make sure that the detector output is off (i.e., the signal is not being received before it is expected). If the detector output is not off at point F, the wakeup is considered unreliable (i.e., block 612). If the detector output is off at point F, the sampling continues, and if the signal is detected at point A', the counter starts as previously described to validate burst duration. If the detection continues past expected endpoint B' to C,' the burst is considered to have persisted too long to be a valid wakeup impulse sequence and will be ignored (block 616). During each bit decode, if the detector does not come on, a bit of value binary zero is considered to have been received. This receipt is not an indication of an incorrect duration.

Figure 8:
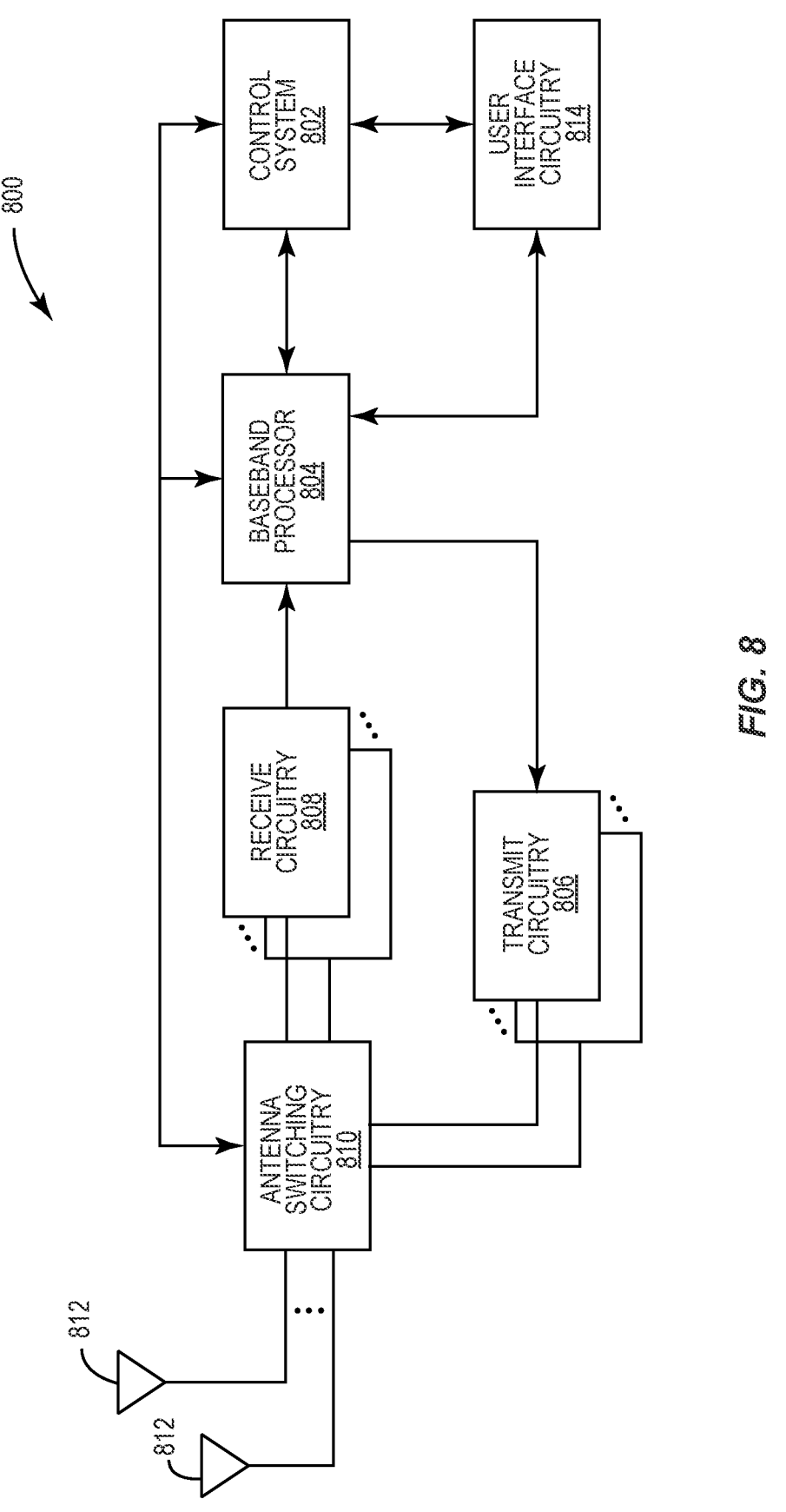
FIG. 8 is a block diagram of a transceiver circuit in which aspects of the present disclosure may be implemented.

In the interests of completeness, a description of a user terminal that may include the receiver circuit 38 is provided with reference to FIG. 8. The concepts described above may be implemented in various types of user elements 800, such as mobile terminals, smart watches, tablets, computers, navigation devices, access points, and like wireless communication devices that support wireless communications, such as cellular, wireless local area network (WLAN), Bluetooth, and near field communications. The user elements 800 will generally include a control system 802, a baseband processor 804, transmit circuitry 806, receive circuitry 808 (which may include or implement aspects of the present disclosure), antenna switching circuitry 810, multiple antennas 812, and user interface circuitry 814. In a non-limiting example, the control system 802 can be a field-programmable gate array (FPGA) or an application-specific integrated circuit (ASIC), as an example. In this regard, the control system 802 can include at least a microprocessor(s), an embedded memory circuit(s), and a communication bus interface(s). The receive circuitry 808 mainly refers to the main receiver circuit 38 but is woken up responsive to aspects of the present disclosure and receives radio frequency signals via the antennas 812 and through the antenna switching circuitry 810 from one or more base stations. A low noise amplifier and a filter of the receive circuitry 808 cooperate to amplify and remove broadband interference from the received signal for processing. Downconversion and digitization circuitry (not shown) will then downconvert the filtered, received signal to an intermediate or baseband frequency signal, which is then digitized into one or more digital streams using an analog-to-digital converter(s) (ADC).

The baseband processor 804 processes the digitized received signal to extract the information or data bits conveyed in the received signal. This processing typically comprises demodulation, decoding, and error correction operations. The baseband processor 804 is generally implemented in one or more digital signal processors (DSPs) and ASICs.

For transmission, the baseband processor 804 receives digitized data, which may represent voice, data, or control information, from the control system 802, which it encodes for transmission. The encoded data is output to the transmit circuitry 806, where a digital-to-analog converter(s) (DAC) converts the digitally encoded data into an analog signal, and a modulator modulates the analog signal onto a carrier signal that is at a desired transmit frequency or frequencies. A power amplifier will amplify the modulated carrier signal to a level appropriate for transmission and deliver the modulated carrier signal to the antennas 812 through the antenna switching circuitry 810 to the antennas 812. The multiple antennas 812 and the replicated transmit and receive circuitries 806, 808 may provide spatial diversity. Modulation and processing details will be understood by those skilled in the art.

Those skilled in the art will recognize improvements and modifications to the preferred aspects of the present disclosure. All such improvements and modifications are considered within the scope of the concepts disclosed herein and the claims that follow.

What is claimed is:

1. A receiver device, comprising:
   receive circuitry comprising:
   a main receiver circuit; and
   a wakeup receiver circuit, the receive circuitry configured to:
   receive a possible wakeup impulse sequence;
   determine that the possible wakeup impulse sequence is a wakeup impulse sequence by verifying that the possible wakeup impulse sequence includes a first pulse burst that ends at an expected time;
   evaluate the wakeup impulse sequence to determine a preamble, a start frame delimiter (SFD), and an address within the wakeup impulse sequence, wherein:
   the preamble comprises a plurality of preamble symbols, and each of the plurality of preamble symbols comprises a corresponding pulse burst;
   the SFD comprises a start bit symbol; and
   the address comprises a plurality of address symbols modulated to represent an identification of the receiver device.

2. The receiver device of claim 1, wherein the first pulse burst has a duration of approximately eight microseconds.

3. The receiver device of claim 1, wherein each of the plurality of preamble symbols has a symbol duration of approximately one millisecond.

4. The receiver device of claim 1, wherein the first pulse burst is modulated to represent a binary one.

5. The receiver device of claim 1, wherein the start bit symbol is modulated to represent a binary zero.

6. The receiver device of claim 1, wherein the first pulse burst comprises a plurality
   of chip intervals of an identical chip interval duration, and
   each of the plurality of chip intervals comprise a pulse.

7. A method of operating a receiver circuit, comprising:
   receiving a possible wakeup impulse sequence from a transmitter device;
   determining that the possible wakeup impulse sequence is a wakeup impulse sequence by verifying that the possible wakeup impulse sequence includes a first pulse burst that ends at an expected time;
   evaluating the wakeup impulse sequence to determine a preamble, a start frame delimiter (SFD), and an address within the wakeup impulse sequence, wherein:
   the preamble comprises a plurality of preamble symbols, and each of the plurality of preamble symbols comprises a corresponding pulse burst;
   the SFD comprises a start bit symbol; and
   the address comprises a plurality of address symbols modulated to represent an identification of the receiver circuit.

8. The method of claim 7, wherein the first pulse burst has a duration of approximately eight microseconds.

9. The method of claim 7, wherein each of the plurality of preamble symbols has a symbol duration of approximately one millisecond.

10. The method of claim 7, wherein the first pulse burst is modulated to represent a binary one.

11. The method of claim 7, wherein the start bit symbol is modulated to represent a binary zero.

12. The method of claim 7, wherein the first pulse burst comprises a plurality of chip
   intervals of an identical chip interval duration, and each of the plurality of chip intervals comprises a pulse.

13. A wireless communication device comprising:
   a baseband processor (BBP);
   a transmitter coupled to the BBP and configured to transmit a transmitted wakeup impulse sequence to a receiver device wherein the transmitted wakeup impulse sequence comprises a preamble, a start frame delimiter (SFD), and an address, wherein:
      the preamble comprises a plurality of preamble symbols, and each of the plurality of preamble symbols comprises a pulse burst;
      the SFD comprises a start bit symbol; and
      the address comprises a plurality of address symbols modulated to represent an identification of the receiver device; and
   receive circuitry coupled to the BBP, the receive circuitry comprising:
      a main receiver circuit; and
      a wakeup receiver circuit, the wakeup receiver circuit configured to:
         receive a possible wakeup impulse sequence;
         determine that the possible wakeup impulse sequence is a received wakeup impulse sequence by verifying that the possible wakeup impulse sequence includes a first pulse burst that ends at an expected time;
   evaluate the received wakeup impulse sequence to determine a receive preamble, a receive SFD, and a receive address within the received wakeup impulse sequence.

14. The wireless communication device of claim 13, wherein the transmitter comprises an ultrawideband (UWB) transmitter.

15. The wireless communication device of claim 13, wherein the pulse burst has a
   duration of approximately eight microseconds.

16. The wireless communication device of claim 13, wherein each of the plurality of preamble symbols has a symbol duration of approximately one millisecond.

17. The wireless communication device of claim 13, wherein the pulse burst is modulated to represent a binary one.

18. The wireless communication device of claim 13, wherein the start bit symbol is modulated to represent a binary zero.

19. The wireless communication device of claim 13, wherein the pulse burst comprises a plurality of chip intervals of an identical chip interval duration, and each of the plurality of chip intervals comprises a pulse.

20. The wireless communication device of claim 13, wherein the wakeup receiver circuit is further configured to verify that the possible wakeup impulse sequence comprises a subsequent pulse burst that starts and stops within an expected interval.

\* \* \* \* \*